United States Patent
Haselhuhn et al.

(10) Patent No.: US 11,065,711 B2
(45) Date of Patent: Jul. 20, 2021

(54) HIGH ASPECT RATIO WELD FACE DESIGN FOR DISSIMILAR METAL WELDING

(71) Applicant: GM GLOBAL TECHNOLOGY OPERATIONS LLC, Detroit, MI (US)

(72) Inventors: Amberlee S. Haselhuhn, Troy, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 16/178,806

(22) Filed: Nov. 2, 2018

(65) Prior Publication Data

US 2020/0139481 A1 May 7, 2020

(51) Int. Cl.
*B23K 11/20* (2006.01)
*B23K 11/11* (2006.01)
(Continued)

(52) U.S. Cl.
CPC .............. *B23K 11/20* (2013.01); *B23K 11/115* (2013.01); *B23K 11/3009* (2013.01);
(Continued)

(58) Field of Classification Search
CPC .......... B23K 35/0261; B23K 2101/006; B23K 2103/20
See application file for complete search history.

(56) References Cited

U.S. PATENT DOCUMENTS

| 2009/0078683 | A1* | 3/2009 | Khakhalev | B23K 11/11 219/78.16 |
| 2015/0096962 | A1* | 4/2015 | Sigler | B23K 35/0261 219/91.2 |

(Continued)

FOREIGN PATENT DOCUMENTS

JP 2016225087 * 11/2016 ............. B23K 11/11

OTHER PUBLICATIONS

Zhang, W; Sun, D; Han, L; and Li, Y; Optimized Design of Electrode Morphology for Novel Dissimilar Resistance Spot Welding of Aluminium Ally and Galvanized High Strength Steel, 2017, Materials and Design, 85, 461-470 (Year: 2017).*

(Continued)

*Primary Examiner* — Tu B Hoang
*Assistant Examiner* — Erwin J Wunderlich
(74) *Attorney, Agent, or Firm* — Vivacqua Crane

(57) ABSTRACT

An electrical resistance spot welding electrode is disclosed for contact with a narrow or other selected spot weld region in a steel workpiece in a stack-up with an aluminum alloy workpiece for use in a spot welding method in which the weld nugget is carefully formed in the aluminum workpiece at the interface of the stack-up. The welding face of the welding electrode for contact with the steel workpiece is shaped with an aspect ratio greater than one, which fits against the contact surface of the steel workpiece, while the welding face for the aluminum-contacting weld electrode is circular (with an aspect ratio equal to one). The stack-up of (Continued)

workpieces may include a single steel workpiece facing two aluminum workpieces in a sandwich type stack-up or two steel workpieces facing a single aluminum workpiece with the outer steel workpiece having the narrow contact surface for the steel welding electrode.

11 Claims, 5 Drawing Sheets

(51) Int. Cl.
 *B23K 11/30* (2006.01)
 *B23K 35/02* (2006.01)
 *B23K 11/31* (2006.01)
 *B23K 103/20* (2006.01)
 *B23K 101/00* (2006.01)

(52) U.S. Cl.
 CPC ........ *B23K 35/0261* (2013.01); *B23K 11/314* (2013.01); *B23K 2101/006* (2018.08); *B23K 2103/20* (2018.08)

(56) References Cited

U.S. PATENT DOCUMENTS

2017/0106466 A1* 4/2017 Sigler .................. B23K 11/185
2018/0079026 A1* 3/2018 Miyazaki ............... B23K 26/36

OTHER PUBLICATIONS

JP-2016225087 translation.*

* cited by examiner

HIGH ASPECT RATIO WELD FACE DESIGN FOR DISSIMILAR METAL WELDING

INTRODUCTION

Resistance spot welding is a process used by a number of industries to join together two or more metal workpieces. The automotive industry, for example, often uses resistance spot welding to join together metal workpieces during the manufacture of vehicle structural frame members (e.g., body sides and cross-members) and vehicle closure members (e.g., vehicle doors, hoods, trunk lids, and lift gates), among others. A number of spot welds are often formed at various points around a peripheral edge of a stack-up of overlying metal workpieces, or some other bonding region, to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. Such steel and aluminum workpieces may have thin protective coatings (such as galvanized steel or resin-coated aluminum alloy) and are typically in the form of a sheet metal layer, or a casting or extrusion with a relatively thin portion (e.g., about 0.3 mm to about 6 mm in thickness), or any other piece that is resistance spot weldable, inclusive of surface layers or coatings, if present. The aforementioned desire to resistance spot weld such dissimilar metal workpieces is not unique to the automotive industry; indeed, it extends to other industries including the aviation, maritime, railway, and building construction industries.

Resistance spot welding relies on the flow of electrical current through overlapping metal workpieces and across their faying interface(s) to generate the heat needed for welding. To carry out such a welding process, a set of opposed welding electrodes is pressed in facial alignment against opposite sides of the workpiece stack-up, which typically includes two or three metal workpieces arranged in a lapped configuration. Electrical current is then passed from one welding electrode to the other, in a linear path directly through the metal workpieces. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon termination of the current flow, solidifies into a weld joint that weld bonds the two workpieces together.

In practice, however, spot welding an aluminum workpiece to a steel workpiece is challenging since a number of characteristics of those two metals can adversely affect the strength—most notably the peel and cross-tension strength—of the weld joint. For one, the aluminum workpiece usually contains a mechanically tough, electrically insulating, and self-healing refractory oxide surface layer. This oxide surface layer is typically comprised of aluminum oxide compounds, but may include other metal oxide compounds as well, including those of magnesium oxide when the aluminum workpiece is composed, for example, of a magnesium-containing aluminum alloy. The refractory oxide surface layer has a tendency to remain intact at the faying interface where it not only hinders the ability of the molten aluminum weld pool to wet the steel workpiece, but also provides a source of near-interface defects within the growing weld pool. Furthermore, the insulating nature of the refractory oxide surface layer raises the electrical contact resistance of the aluminum workpiece—namely, at its faying surface and at its electrode contact point—making it difficult to effectively control and concentrate heat within the aluminum workpiece.

Apart from the challenges presented by the refractory oxide surface layer of the aluminum workpiece, the aluminum workpiece and the steel workpiece possess different properties that can adversely affect the strength and properties of the weld joint. Specifically, aluminum has a relatively low melting point (~600° C.) and relatively low electrical and thermal resistivities, while steel has a relatively high melting point (~1500° C.) and relatively high electrical and thermal resistivities. As a consequence of these differences in material properties, most of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current flow is terminated, a situation occurs where heat is not disseminated symmetrically from the weld zone. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in several ways. First, because the steel workpiece retains heat for a longer duration than the aluminum workpiece after the flow of electrical current has terminated, the molten aluminum weld pool solidifies directionally, starting from the region proximate the colder welding electrode (often water cooled) associated with the aluminum workpiece and propagating towards the faying surface of the steel workpiece. A solidification front of this kind tends to sweep or drive defects—such as gas porosity, shrinkage voids, and micro-cracking—towards and along the bonding interface of the weld joint and the steel workpiece where residual oxide film defects are already present. The residual oxide film defects can be particularly disruptive if combined with thermal decomposition residuals from either an adhesive layer or other organic material layer that may be present between the aluminum and steel workpieces. Second, the sustained elevated temperature in the steel workpiece promotes the growth of a hard and brittle Fe—Al intermetallic layer within the weld joint and contiguous with the faying surface of the steel workpiece. Having a dispersion of weld defects together with excessive growth of the Fe—Al intermetallic layer at the bonding interface tends to reduce the peel and cross-tension strength of the weld joint.

Methods have been developed for spot welding of a steel workpiece to an aluminum alloy workpiece as disclosed in co-pending U.S. patent application Ser. No. 14/503,969, filed 2014, titled "Aluminum Alloy to Steel Welding Process", and assigned to the assignee of this invention. The full specification of this co-pending application is incorporated by reference into the subject specification.

The disclosed methods of the '969 patent application use welding electrodes with round hollow bodies (for water cooling) and generally round, tapered and convex weld faces of suitable diameters and radii of curvature (of the weld face of a given diameter) for the formation of one or more resistance spot welds between a stack-up that includes one or two thin steel alloy workpieces (stacked together) and one or two relatively thin aluminum alloy workpieces (stacked together). A convex weld face, particularly on a welding electrode for contacting an aluminum alloy workpiece, may have upstanding concentric rings machined into the weld face for more penetrating contact of the weld face with the workpiece during a weld cycle—a multi-ring domed (MRD) electrode. The contacting surfaces of the weld faces of the copper-based electrode for the steel workpiece and of the copper-based welding electrode for the aluminum alloy workpiece are typically sized and shaped differently, such that during the passage of the welding current between the opposing electrodes and through the workpieces, the area of the generally round contact patch formed by the welding electrode face engaging the aluminum workpiece is larger (at least 1.5 times larger) than the area of the round contact patch formed by the welding electrode face engaging the steel workpiece. This practice with respect to the shapes and sizes of the electrode faces of the two electrodes, engaging their intended workpieces, enables the formation of a high-quality weld nugget within the aluminum alloy workpiece(s) and at the faying interface of the workpieces.

Depending on the shapes, thicknesses and compositions of the workpieces the diameter of the electrode face engaging the aluminum alloy workpiece may be up to about 20 mm and the diameter of the electrode face engaging the steel workpiece may be up to about 16 mm. The disclosed methods are effective in forming electrical resistance spot welds, especially when a series of spot welds are required on a workpiece, for example, around the periphery of an assembly of a steel sheet and an aluminum alloy sheet that are shaped as inner and outer panels for an automotive vehicle door with a window (or a narrow structure in another type of vehicle). However, there are situations in which the steel workpiece presents a narrow surface (such as a flange near a window) that is not wide enough to receive the round weld face of a welding electrode sized to form a suitably sized spot weld. In many instances it is not suitable to simply downsize the diameters of the weld electrodes and the formed welds to fit on the narrow flange. The smaller spot welds are not sufficiently strong. There are additional reasons that it is difficult to create strong weld joints in certain stack-ups of thin sections of steel and aluminum alloy workpieces. Sometimes the welding produces a too thick FeAl-intermetallic layer due to the compositions of the sheets or like workpieces. And sometimes the resulting welded joint allows excessive deflection of the steel member which can fracture the intermetallic layer at the weld interface of the steel/aluminum alloy workpieces. It is now recognized that it is desirable to ensure that the Fe—Al intermetallic layer at the weld is suitably thin to avoid problems with the formed weld(s).

Accordingly, there is a need to adapt the described welding methods and the welding electrode contacting surfaces to accommodate the resistance spot welding of a narrow weld-surface region(s) in a stacked assembly of one or two steel workpieces and one or two adjoining stacked aluminum alloy workpieces placed on the same side of the steel workpiece, or vice-versa (but a total of three stacked workpieces). It is also believed that by limiting the width of the weld face of the steel welding electrode useful asymmetric fusion zones may be produced. These should result in thinner and higher strength intermetallic regions that can help welding of difficult stack-ups where high strength is required at the aluminum-to-steel interface. The high aspect ratio welding faces on the steel welding electrode can also serve well in welding through an adhesive layer applied to the interface by providing a shorter path for adhesive to escape from beneath the welding electrodes during the welding process.

SUMMARY OF THE DISCLOSURE

Resistance welding electrodes are typically formed of copper or a copper-based alloy. For purposes of brevity in this specification, the shaped copper electrode employed for engagement with a surface of an aluminum alloy workpiece will be referred to as an aluminum alloy welding electrode. And the copper electrode employed for engagement with a surface of a steel workpiece will be referred to as a steel welding electrode.

The welding face of the aluminum alloy welding electrode is preferably circular and thus has an aspect ratio (AR) of one (1). And, for example, the diameter of the welding face for the aluminum alloy welding electrode is suitably in the range of about 6 mm to about 20 mm. The weld face of the aluminum alloy welding electrode may be flat or it may be convex, with a spherical radius, lying on the top of a tapered structure extending axially from the round base of the welding electrode.

The welding face of the steel welding electrode, to engage the outer surface of the steel workpiece, is shaped to fit into a narrow spot welding surface while delivering a suitable welding current to the stack-up. But the subject steel welding electrode may be used in other aluminum alloy/steel stack-ups in which it is helpful to manage the Fe—Al intermetallic layer. The weld face of the steel welding electrode is not circular and its shape will have an aspect ratio greater than one (preferably greater than 1.5). For example, the plan-view shape of the weld face of the steel welding electrode may be rectangular, or elliptical, or shaped like an oval with straight long sides (race track), or like a circle with one or more parallel slices removed. Thus, the weld face of the steel welding electrode has a narrow portion and a long portion. Suitably, the minimum dimension (narrow portion) of the steel welding electrode weld face is about 1.5 mm and the maximum dimension (long portion) is about 16 mm (the suitable maximum dimension of the round body of the steel welding electrode) and preferably 2 mm (min) by 10 mm (max). For example, the steel workpiece engaging face of the steel welding electrode may be generally rectangular, with dimensions of 3.5 mm by 10 mm. Thus, it will have an aspect ratio greater than one (AR=2.8). This high aspect ratio weld face on the steel welding electrode will lie at the top or end of a tapered portion extending from the round base of the electrode. In some applications the weld face will be off-center or tilted. The orientation of the high aspect ratio weld face on the steel welding electrode will lie such that it fits into the narrow width portion on the steel workpiece in which the resistance weld is to be carefully located. It is also believed that by limiting the width of the weld face of the steel welding electrode, useful asymmetric fusion zones may be produced. These should result in thinner and higher strength Fe—Al intermetallic regions that can help welding if difficult welding stack-ups where high strength is required at the aluminum-to-steel interface. The high aspect ratio welding faces on the steel welding electrode can also serve well in welding through an adhesive layer applied to the interface by providing a shorter path for adhesive to escape from beneath the welding electrodes during the welding process.

Before presenting more details on the shapes and making of the aluminum alloy welding electrodes and steel welding electrodes for resistance welding aluminum alloys to steel, it is necessary to describe the resistance welding processes in which they are employed.

The method for resistance spot welding a stack-up that includes one steel workpiece lying against one side of one or two aluminum alloy workpieces (or vice-versa) involves contacting opposite sides of the stack-up with opposed welding electrodes at a predetermined weld site. The non-round steel welding electrode face (with an AR >1.5) contacts and is pressed against the outer side of a weld surface site of the steel workpiece. And the round aluminum alloy welding electrode face (AR=1 or close to 1) contacts and is pressed against the outer side of the aluminum alloy workpiece. The welding faces of the two facing electrodes are in axial alignment. A predetermined weld force is applied by the opposing electrodes prior to welding, and a like or different weld force is applied during welding. An electrical current is then passed between the welding electrodes through the stack-up to initiate and grow a molten aluminum alloy weld pool within the aluminum alloy workpiece(s) and at a faying interface(s) of the workpieces. The welding electrodes form a contact patch in their respective workpieces and, after cessation of the current flow, the round (circular) contact patch formed at the contacted surface of the aluminum alloy workpiece is greater in surface area than the non-circular contact patch formed in the contacted outer surface of the steel workpiece(s). The difference in contact patch sizes due to different weld face geometries results in passage of the electrical current through the steel workpiece(s) at a greater current density than in the aluminum alloy workpiece(s).

The differing shapes of the respective welding electrode weld faces and the difference in current density between the steel and aluminum alloy workpieces (greater current density in the steel workpiece) concentrates heat within a smaller zone in the steel workpiece as compared to the aluminum alloy workpiece. The weld current schedule can even be regulated, if desired, to initiate a molten steel weld pool within the bulk of the steel workpiece(s) without the molten steel contacting the molten aluminum, in addition to initiating the molten aluminum alloy weld pool within the aluminum alloy workpiece(s) and at the faying interface. The act of concentrating heat within a smaller zone in the steel workpiece—possibly to the extent of initiating a molten steel weld pool—modifies the temperature gradients and, thereby, the solidification behavior of the molten aluminum alloy weld pool. These thermally-induced effects can result in a weld joint at the faying interface that has improved peel strength and better overall structural integrity.

In particular, the belief is that concentrating heat within a smaller zone in the narrow portion of the steel workpiece(s) as compared to the aluminum alloy workpiece(s) causes temperature gradients to be formed within and around the molten aluminum alloy weld pool, allowing the weld pool to solidify from its outer perimeter towards its central region at the weld site interface more effectively than if a round, AR=1, weld face were employed by the steel welding electrode This solidification would be driven in the direction of the short (or narrow) axis of the weld face for the steel welding electrode. A solidification front that moves inwards from the weld pool perimeter towards the center of the weld pool, in turn, drives weld defects, such as gas porosity, shrink porosity, micro-cracks, and oxide film remnants, toward the center of the weld joint where they are less prone to affect the mechanical properties of the weld joint. In addition, by limiting the width of the heated zone in the steel, excessive heating at the weld center is avoided, which helps control Fe—Al intermetallic thickness. Further, concentrating heat so that a steel weld pool is initiated in the steel workpiece can further help drive defects into the center of the weld joint by causing the steel workpiece to thicken towards the faying interface. Such thickening of the steel workpiece helps the center region of the molten aluminum alloy weld pool stay heated so that it solidifies last. The non-planar faying interface created through thickening of the steel workpiece can also help resist crack growth in the ultimately-formed weld joint. There are a variety of welding electrode constructions and combinations that can be used to spot weld the steel and aluminum alloy workpieces of the stack-up such that a greater electrical current density is achieved in the steel workpiece as compared to the aluminum alloy workpiece(s). The welding electrode on the steel side, for example, can have a planar or relatively planar weld face. But the steel welding face will be non-circular with, for example, a rectangular or elliptical weld face with an AR greater than one (preferably greater than 1.5), and with a minimum dimension adapted to contact a relatively narrow area on the steel workpiece or a selected area in another stack-up for forming a resistance spot weld between steel and aluminum alloy workpieces. The welding electrode on the aluminum alloy side can have a planar or more radiused weld face of a larger diameter.

In the article of manufacture formed by the formation of the spot weld(s) between the steel workpiece and the aluminum alloy workpiece, the respective outer surfaces of the workpieces at the weld site contain weld patches which result from the specified shapes of the steel welding electrode and the aluminum alloy welding electrode.

DETAILED DESCRIPTION

Figure 1:
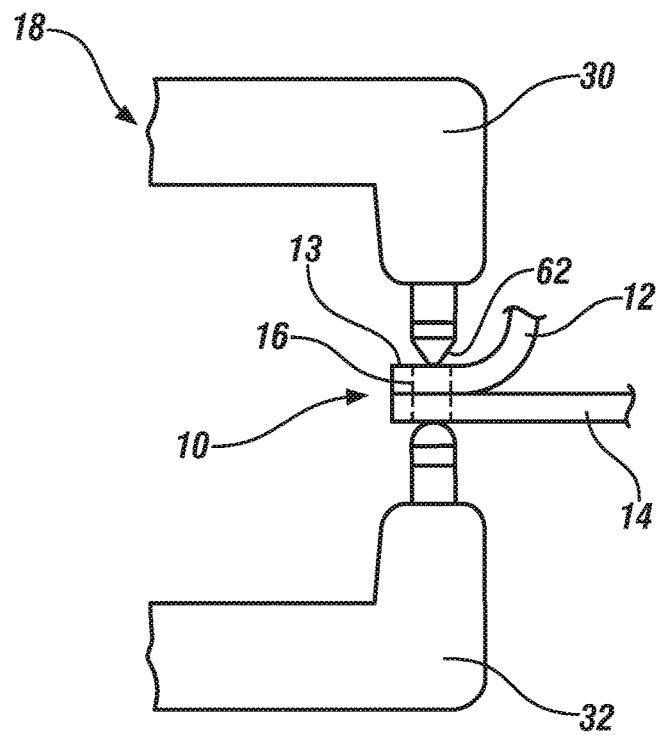
FIG. 1 is a side elevational view of a workpiece stack-up that includes a steel workpiece, with a narrow flange portion, and an aluminum alloy workpiece that are assembled in overlapping fashion for resistance spot welding at a predetermined weld site by a welding gun.
Figure 2:
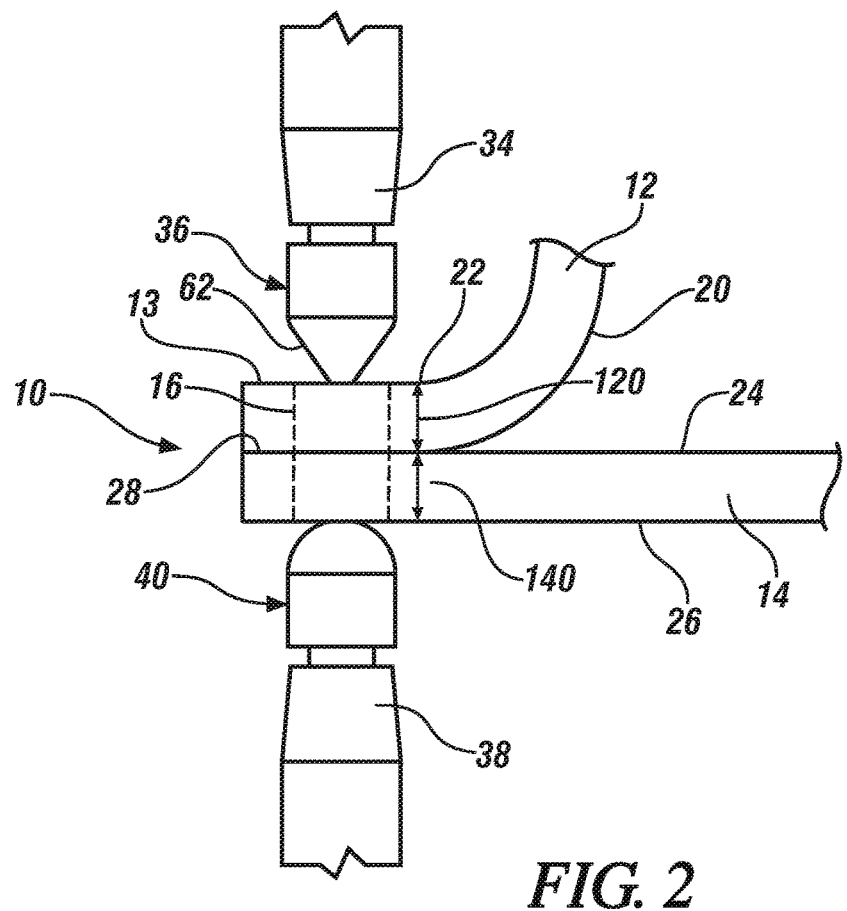
FIG. 2 is an enlarged partial view of the stack-up and the opposed welding electrodes depicted in FIG. 1.
Figure 3:
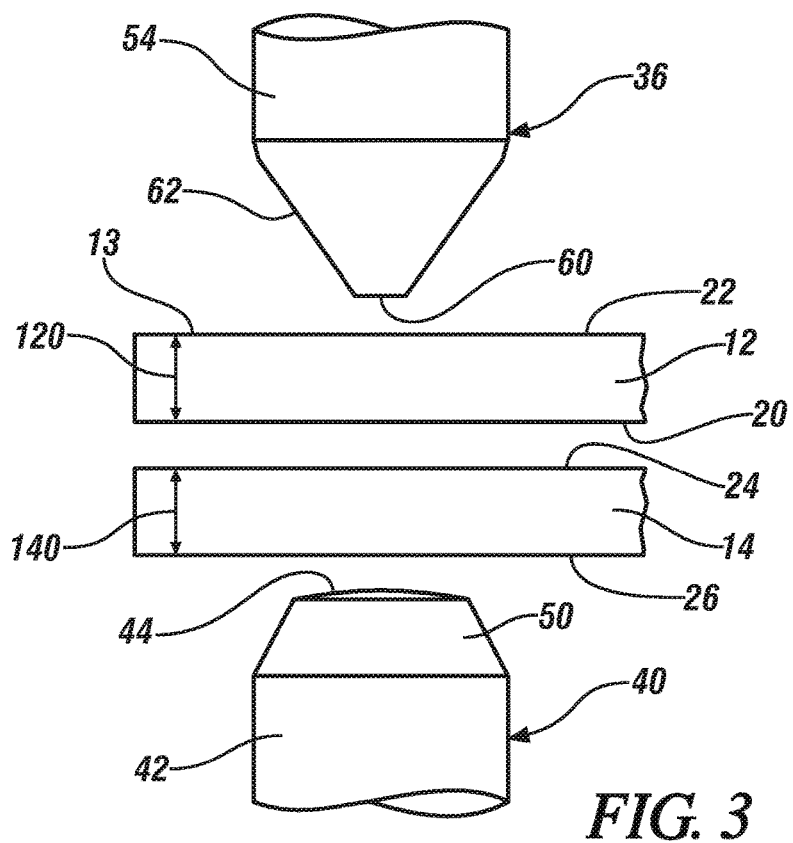
FIG. 3 is an exploded partial side view of the stack-up and opposed welding electrodes illustrated in FIG. 2.

FIGS. 1-3 generally depict a workpiece stack-up 10 that includes a flanged steel workpiece 12 and an aluminum alloy workpiece 14 that are assembled in overlapping fashion for resistance spot welding at a predetermined weld site 16 by a welding gun 18. In this case, the steel workpiece 12 is characterized by a narrow flange portion 13 for contact with a weld electrode. The aluminum alloy workpiece 14 provides an ample surface area at the intended weld site. The practices of this disclosure may also be utilized when the stack-up includes a second aluminum alloy workpiece placed, side-to-side, against the outer surface 26 of the aluminum alloy workpiece 14, stacked against the narrow flange portion 13 of the steel workpiece 12. Also, the practices of this invention may be utilized when the stack-up includes a second steel alloy workpiece placed side-to-side against surface 20 of the steel workpiece 12. In this illustration, neither a second aluminum workpiece nor a second steel workpiece is illustrated in FIGS. 1-3 in order to simplify the description of the process, and the specific configuration of the weld electrode, adapted for engaging the narrow flange portion 13 of the weld electrode-contacted steel workpiece 12.

The steel workpiece 12 is preferably a galvanized (e.g., hot dip galvanized), or zinc-coated, low-carbon steel. Other types of steel workpieces may of course be used including, for example, a low-carbon bare steel or a galvanized advanced high strength steel (AHSS). Some specific types of steels that may be used in the steel workpiece 12 are interstitial-free (IF) steel, dual-phase (DP) steel, transformation-induced plasticity (TRIP) steel, and press-hardened steel (PHS). Regarding the aluminum alloy workpiece 14, it may be an aluminum-magnesium alloy, an aluminum-silicon alloy, an aluminum-magnesium-silicon alloy, or an aluminum-zinc alloy, and it may be coated with zinc or a conversion coating to improve adhesive bond performance, if desired. Some specific aluminum alloys that may be used in the aluminum alloy workpiece 14 are 5754 aluminum-magnesium alloy, 6022 aluminum-magnesium-silicon alloy, and 7003 aluminum-zinc alloy. The term "workpiece" and its steel and aluminum variations are used broadly in the present disclosure to refer to a sheet metal layer, a casting, an extrusion, or any other piece that is resistance spot weldable, inclusive of any surface layers or coatings, if present. But in this example, one or more resistance spot welds need to be formed in a narrow surface area portion, like in a flange portion 13 of steel workpiece 12. In an assembly comprising two steel workpieces and a single aluminum alloy workpiece, the second steel workpiece would be located between steel workpiece 12 and aluminum alloy workpiece 14 as illustrated in FIG. 1.

When stacked-up for spot welding, the steel workpiece 12 includes a narrow flange 13 that has been formed adjacent to a large or main portion of the shaped workpiece 12. In the stack-up 10, the flange 13 has a faying surface 20 and a weld electrode-contacting surface 22. Likewise, the aluminum alloy workpiece 14 includes a faying surface 24 and a weld electrode-contacting surface 26. The faying surfaces 20, 24 of the two workpieces 12, 14 contact one another to provide a faying interface 28 at the weld site 16. The electrode-contacting surfaces 22, 26 of the steel and aluminum alloy workpieces 12, 14, on the other hand, generally face away from each other in opposite directions to make them accessible by a pair of opposed spot welding electrodes. Each of the steel and aluminum alloy workpieces 12, 14 preferably has a thickness 120, 140 that ranges from about 0.3 mm to about 6.0 mm, and more preferably from about 0.5 mm to about 4.0 mm, at least at the weld site 16. In a stack-up including one of a second aluminum alloy workpiece or a second steel workpiece, the thickness of the interposed portion of the second workpiece may also have a thickness in the range from about 0.3 mm to about 6 mm, preferably from about 0.5 mm to about 4 mm. Frequently, each of the steel and aluminum alloy workpieces are about 1 mm in thickness in stack-ups in which the steel sheet layer is formed with a narrow flange section in which a spot weld is to be formed.

The welding gun 18 is usually part of a larger automated welding operation and includes a first gun arm 30 and a second gun arm 32 that are mechanically and electrically configured and computer-controlled to repeatedly form spot welds in accordance with a defined weld schedule. The first gun arm 30 has a first electrode holder 34 that retains a steel welding electrode 36, and the second gun arm 32 has a second electrode holder 38 that retains an aluminum alloy welding electrode 40. The welding gun arms 30, 32 are operated during spot welding to press their respective welding electrodes 36, 40 against the oppositely-facing electrode-contacting surfaces 22, 26 of the overlapping steel and aluminum alloy workpieces 12, 14. The first and second welding electrodes 36, 40 are typically pressed against their respective electrode-contacting surfaces 22, 26 with the weld faces 44, 60 in diametric or co-axial alignment with one another at the intended weld site 16. Again, in this disclosure, the steel welding electrode 36 is required to engage a narrow width portion 13 of the steel workpiece 12.

The steel welding electrode 36 and the aluminum alloy welding electrode 40 are each formed from an electrically conductive material such as a copper alloy. The two welding electrodes 36, 40, as will be further explained below, are constructed to provide a generally round contact patch at the electrode-contacting surface 26 of the aluminum alloy workpiece 14 that is greater in surface area than a non-circular contact patch (for example, an ellipsoidal or rectangular contact patch) at the electrode-contacting surface 22 of the steel workpiece 12 upon cessation of the passage of electrical current between the electrodes 36, 40. The aluminum alloy contact patch preferably has a surface area that is greater than the surface area of the non-circular steel contact patch by a ratio of about 1.5:1 to about 16:1 and, more preferably, from about 2:1 to about 6:1 at that time. The difference in contact patch sizes results in a greater current density in the steel workpiece 12 than in the aluminum alloy workpiece 14.

The difference in current density between the steel and aluminum alloy workpieces 12, 14 concentrates heat within a smaller zone in the steel workpiece 12 as compared to the aluminum alloy workpiece 14. The weld current schedule can even be regulated, if desired, to initiate a molten steel weld pool within the steel workpiece 12 (or workpieces) in addition to initiating a molten aluminum alloy weld pool within the aluminum alloy workpiece 14 (or workpieces)

and at the faying interface 28. The act of concentrating heat within a smaller zone in the steel workpiece 12—possibly to the extent of initiating a molten steel weld pool—modifies the temperature gradients, in particular the lateral temperature gradients along the short direction or minor axis of the steel electrode weld face, to change the solidification behavior of the molten aluminum alloy weld pool located at the faying interface 28 so that defects in the ultimately-formed weld joint are forced to a more desirable location. In some instances, especially when a steel weld pool is initiated in the steel workpiece 12, the concentration of heat in the steel workpiece and the resultant thermal gradients can drive weld defects, including gas porosity, shrink porosity, microcracks, and oxide film remnants, to conglomerate at or near the center of the weld joint at the faying interface 28, which is conducive to better weld joint integrity and peel strength.

Figure 5:
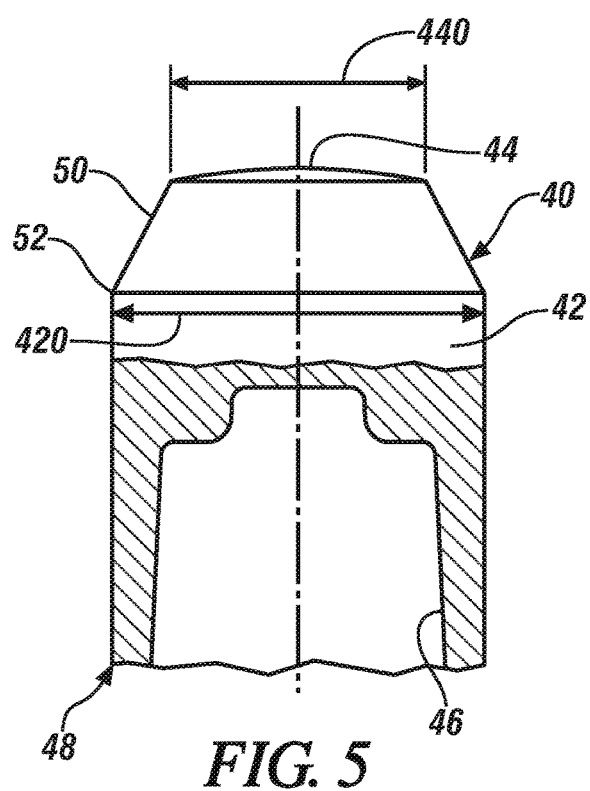
FIG. 5 is an enlarged side elevational view of the aluminum alloy welding electrode depicted in FIG. 3.

The aluminum alloy welding electrode 40 includes a body 42 and a weld face 44. The body 42, as shown best in FIG. 5, defines an accessible hollow recess 46 at one end 48 for insertion of, and attachment with, the second electrode holder 38 in known fashion. A roundly, inwardly tapered transition nose 50 may extend from an opposite end 52 of the body 42 up to the weld face 44, but is not required to, as the weld face 44 can extend directly from the body 42 to provide what is commonly referred to as a "full-face electrode." The body 42 is preferably cylindrical in shape with a diameter 420 that ranges from about 12 mm to about 22 mm, or more narrowly from about 16 mm to about 20 mm. The transition nose 50 is preferably frusto-conical in shape, although other alternative shapes such as spherical and elliptical may be suitable as well. Hollow recess 46 may be used to accommodate water cooling of the aluminum alloy welding electrode 40.

Figure 7:
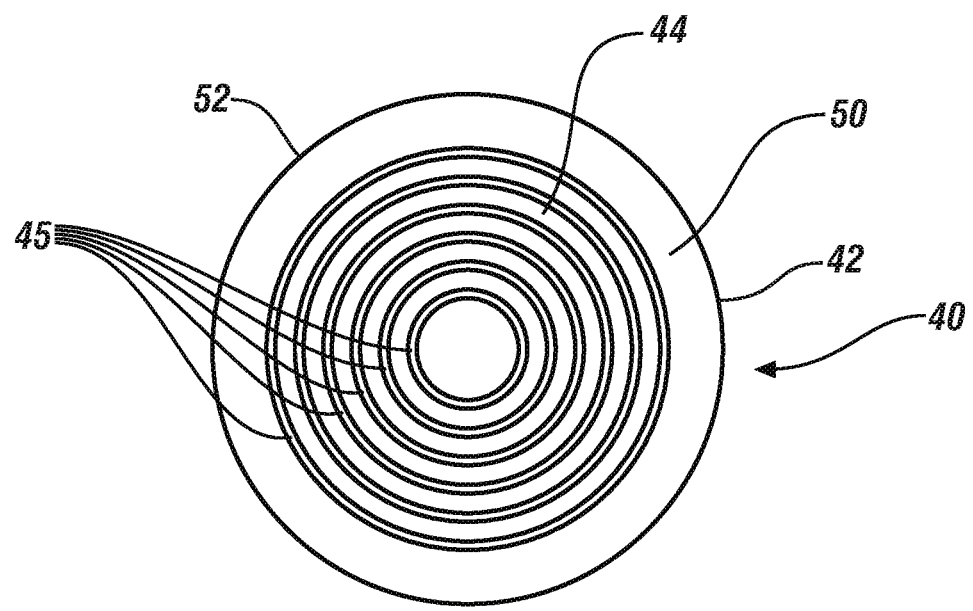
FIG. 7 is an enlarged plan view of the aluminum alloy welding electrode, including its weld face, depicted in FIG. 5.

A plan view of the weld face 44 is shown in FIG. 7. The weld face 44 is the portion of the aluminum alloy welding electrode 40 that makes contact with and is impressed into the electrode-contacting surface 26 of the aluminum alloy workpiece 14 during spot welding to establish a contact patch. The weld face 44 has a diameter 440 and a radius of curvature that, together, are sufficient to prevent excessive indentation into the molten aluminum alloy weld pool and the softened workpiece region surrounding the weld pool. In some embodiments, the weld face 44 may be machined to form a series of five or six upstanding concentric rings of increasing diameter in the curved surface of the weld face. An example of such concentric rings 45 is illustrated in FIG. 7 which presents a plan view of weld face 44 formed on transition nose 50 at the upper end 52 of electrode body 42. In FIG. 7, the group of outwardly extending welding rings 45 comprises five or six concentric circular welding rings of progressively larger diameters, typically centered on the axis of the weld face of the aluminum alloy welding electrode 40. The aspect ratio of machined weld face 44 is one or very close to one.

Excessive indentation is typically defined as indentation that meets or exceeds 50% of the thickness 140 of the aluminum alloy workpiece 14. Such indentation can be avoided, for example, by providing the weld face 44 with a diameter 440 of about 6 mm to about 20 mm and a radius of curvature of about 15 mm to planar. In a preferred embodiment, the diameter 440 of the weld face 44 is about 8 mm to about 12 mm and the radius of curvature is about 20 mm to about 250 mm. The surface area of weld face 44 of the aluminum alloy welding electrode 40 is larger than the surface area of weld face 60 of the steel welding electrode 36. Additionally, if desired, the weld face 44 can be textured or have surface features such as those described in U.S. Pat. Nos. 6,861,609, 8,222,560, 8,274,010, 8,436,269, and 8,525,066 and U.S. Patent Application Publication No. 2009/0255908. The initial cutting and subsequent dressing of weld face circular rings may be accomplished using a cutting tool as disclosed in co-pending patent application Ser. No. 15/418,768, filed Jul. 29, 2017, titled "Welding Electrode Cutting Tool and Method of using the Same", including a coinventor in this disclosure, and assigned to the assignee of this patent application.

Figure 4:
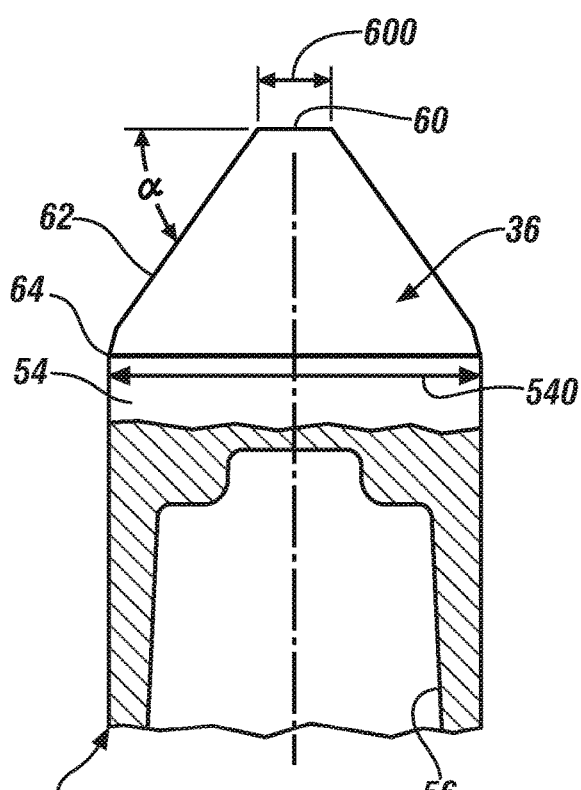
FIG. 4 is an enlarged side elevational view of the steel welding electrode depicted in FIG. 3.
Figure 6:
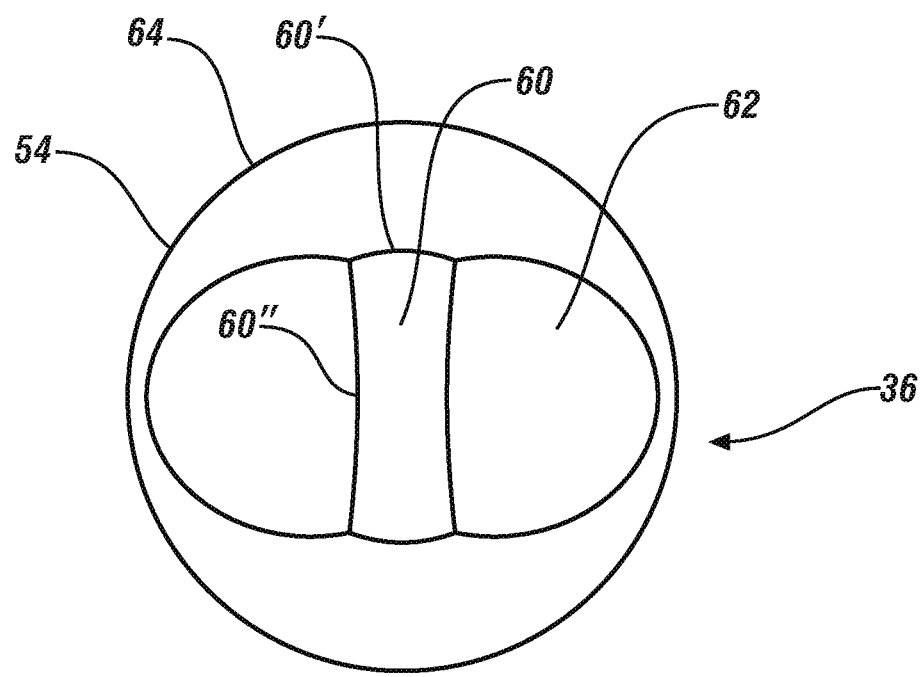
FIG. 6 is an enlarged plan view of the steel welding electrode, including its weld face, depicted in FIG. 4.

The steel welding electrode 36 has a body 54 that defines an accessible hollow recess 56 at one end 58. But steel welding electrode 36 has a weld face 60 that is different from weld face 44 of the aluminum alloy welding electrode 40. As illustrated in FIGS. 4 and 6, weld face 60 is substantially rectangular in shape and lies atop an inwardly tapered transition nose 62 that extends from the body 54 at an opposite end 64 up to the weld face 60, as shown in FIGS. 4 and 6. The body 54 is preferably cylindrical in shape with a diameter 540 that ranges from about 12 mm to about 22 mm, or, more narrowly, from about 16 mm to about 20 mm. The transition nose 62 may be machined from an initially cylindrical or semi-spherical configuration to provide a base for non-circular weld face 60 having an aspect ratio greater than one (preferably greater than 1.5). As illustrated in FIG. 6, weld face 60 has a long side 60" and a short side 60'. The cut angle to form weld face 60 and transition nose 62 is typically used to form the minimum dimension of the intended weld face. The minimum dimension of weld face 60 is 2 mm or greater. The maximum dimension is suitably about 16 mm. In FIG. 4, weld face 60 is illustrated as being substantially flat. As described below weld face may have some outwardly extending curvature. But the machining angle in which the tapered transition nose is formed in the initial cylindrical body of steel electrode 36 is suitably determined using the plane of weld face 60 and machining the body at a machining cut angle α, extending downwardly from weld face 60. Cut angle α is suitably in the range of 10° to 70°, and typically 30° to 60° depending on the starting shape of the electrode body. In FIG. 4, cut angle α is about 60°. Examples of suitable methods for formation of transition nose 62 and the shape of electrode face 60 include machining, grinding, wire electric discharge machining, cutting, shearing, and the like.

Depending on the diameter of the starting electrode body, the body diameter may serve as the major dimension the weld face 60. Otherwise, subsequent machining would remove original copper metal to form the minimum dimension and the maximum dimension of the desired weld face 60. If the diameter of the electrode body coincides with the maximum dimension of the weld face 60, the sides of transition nose are mainly just tapered without declining curved portions.

The aspect ratio of the steel welding electrode weld face is to be greater than 1. In general, the aspect ratio of a shape is defined as the maximum dimension of a two-dimensional shape divided by its minimum dimension. In the case of an elliptical weld face shape, the aspect ratio is determined by dividing its major axis by its minor axis. The aspect ratio of a generally rectangular electrode face is suitably determined by dividing its maximum dimension by its minimum dimension. The maximum dimension of a rectangle is typically a diagonal. In this specification, is maximum dimension is defined as the distance between the center of one short side to the center of the other short side. And the minimum dimension is the distance between the centers of the long sides. The aspect ratio of the welding face 60 of the steel welding electrode should be in the range of 1.5 to 11 and preferably in the range of 2 to 5.

For example, the dimensions of the machined, generally rectangular weld face 60, illustrated in FIG. 6, may be about 10 mm (long side 60") by 3.5 mm (short side 60'), formed on a suitably machined transition nose 62 arising from a circular base having a diameter of about 20 mm. These dimensions provide an aspect ratio of about 2.8. Dimension 600 in FIG. 4 represents the smallest dimension (side 60') of the generally rectangular weld face 60 as formed by the machining of transition nose 62 in the electrode body 54. Weld face 60 of steel welding electrode 36 is aligned such that it will suitably engage, for example, a narrow flange portion 13 of a steel workpiece 12.

While some or all of the portions of the aluminum alloy and steel welding electrodes 40, 36 can be the same—but are not necessarily required to be—the interaction of their weld faces 44, 60 with their respective electrode-contacting surfaces 26, 22 is what enables the welding of a narrow flange on a steel workpiece to a facing surface of one or two aluminum workpieces and renders the current density within the workpieces 12, 14 different.

As stated, weld face 60 is the portion of the steel welding electrode 36 that is shaped with an aspect ratio greater than one for suitable contact with and is impression into the narrow electrode-contacting surface 22 (like flange 13) of the steel workpiece 12 during spot welding to establish a contact patch. Further, the weld face 60 is constructed so that its contact patch (i.e., the one established at the electrode-contacting surface 22 of the steel workpiece 12) is smaller than the contact patch established by the weld face 44 of the aluminum alloy welding electrode 40 at the electrode-contacting surface 26 of the aluminum alloy workpiece 14.

FIGS. 1-3 and 8-10 illustrate a spot welding process in which the stack-up 10 is spot-welded at the weld site 16 using the welding electrodes 36, 40 described above. The welding gun 18 (partially shown) is configured to provide the electrical current and contact pressure needed to spot weld the flange 13 of steel workpiece 12 to the aluminum workpiece 14. The gun arms 30, 32 of the welding gun 18 may be stationary (a pedestal welder) or robotically moveable, as is customary in the art, and are operated during spot welding to contact and press the welding electrodes 36, 40 against the oppositely-facing electrode-contacting surfaces 22, 26 of the steel and aluminum alloy workpieces 12, 14 in generally diametric alignment with one another at the weld site 16. The clamping force assessed by the gun arms 30, 32 helps establish good mechanical and electrical contact between the welding electrodes 36, 40 and their respective electrode-contacting surfaces 22, 26.

Figure 8:
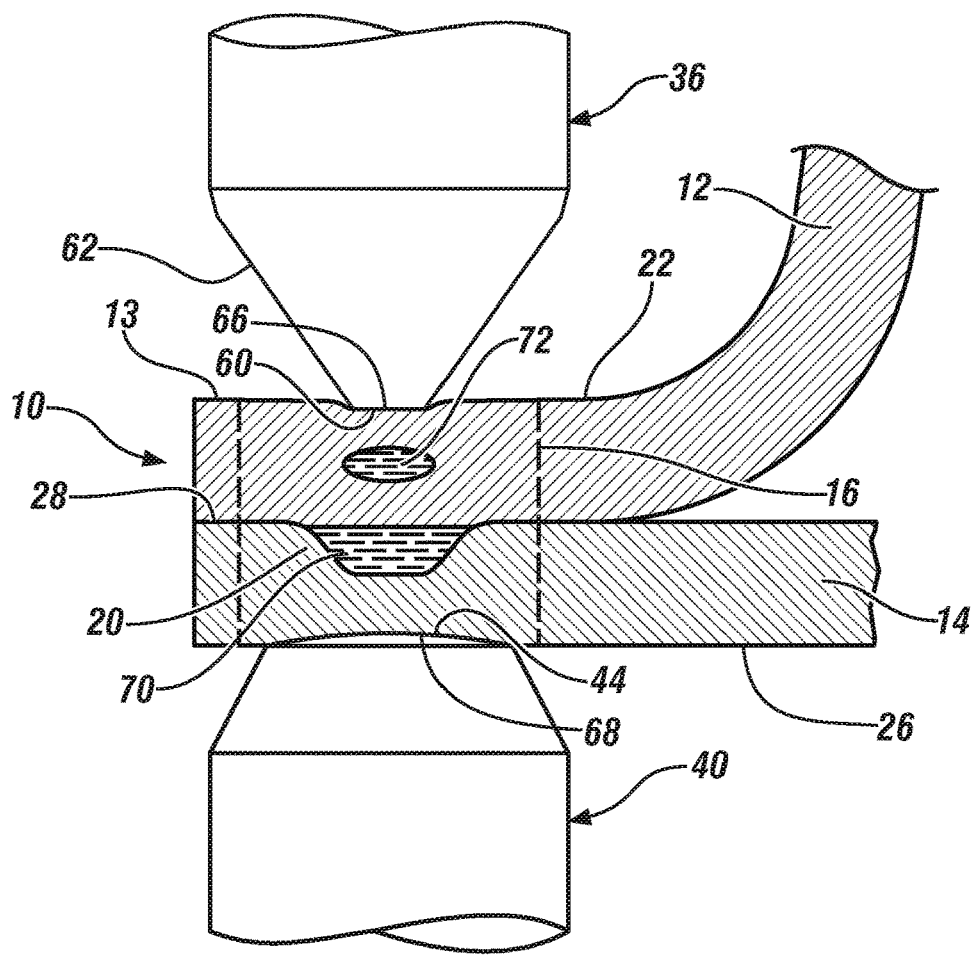
FIG. 8 is an enlarged partial cross-sectional view (stack-up shown in cross-section) of the stack-up during spot welding from the side in which the narrow portion of the high aspect ratio weld face of the steel welding electrode is contacting an electrode-contacting surface of the steel workpiece and the circular aluminum alloy welding electrode is contacting an electrode-contacting surface of the aluminum alloy workpiece.
Figure 10:
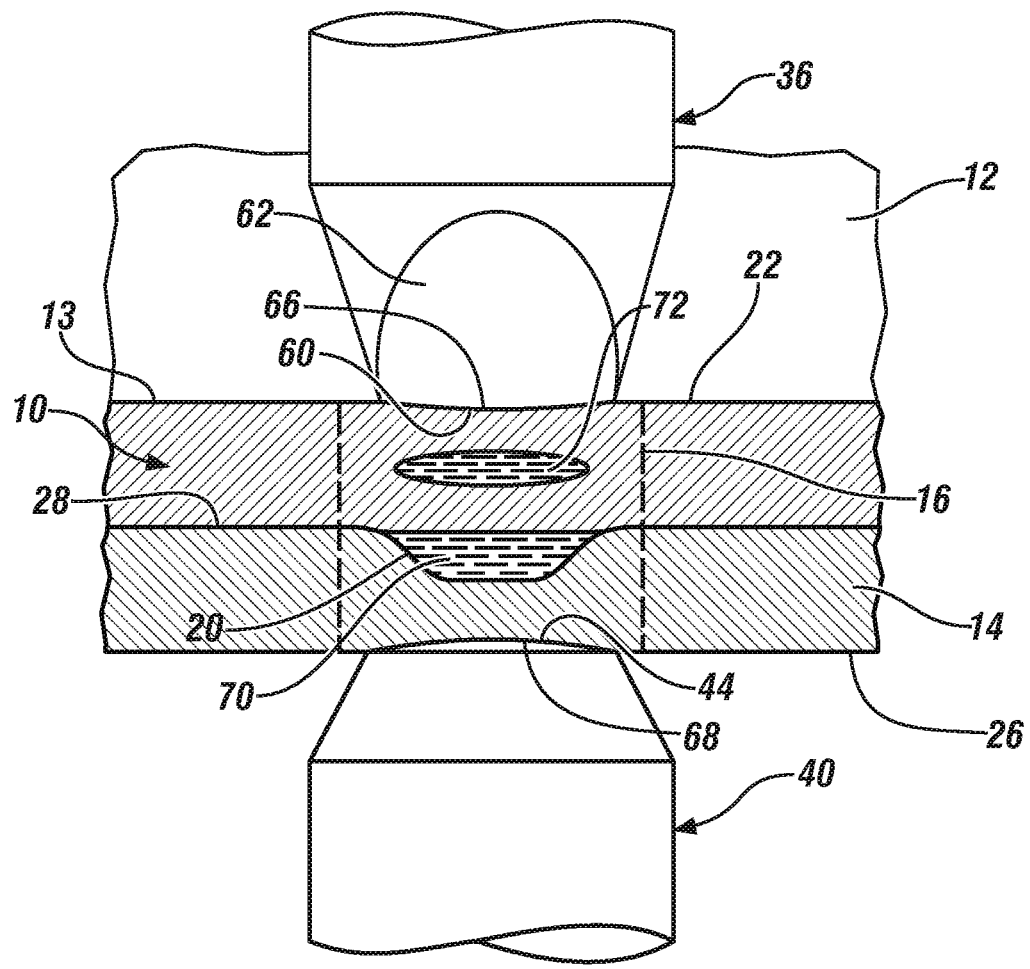
FIG. 10 is an enlarged partial cross-sectional view (stack-up shown in cross-section) of the stack-up during spot welding from the side in which the long portion of the high aspect ratio weld face of the steel welding electrode is contacting an electrode-contacting surface of the steel workpiece and the circular aluminum alloy welding electrode is contacting an electrode-contacting surface of the aluminum alloy workpiece.

The resistance spot welding process begins by locating the stack-up 10 between the steel and aluminum alloy welding electrodes 36, 40 so that the weld site 16 is generally aligned with the opposed weld faces 60, 44. The workpiece stack-up 10 may be brought to such a location, as is often the case when the gun arms 30, 32 are part of a stationary pedestal welder, or the gun arms 30, 32 may be robotically moved to locate the electrodes 36, 40 relative to the weld site 16. Once the stack-up 10 is properly located, the first and second gun arms 30, 32 converge to contact and press the weld faces 60, 44 of the steel welding electrode 36 and the aluminum alloy welding electrode 40 against the oppositely-facing electrode-contacting surfaces 22, 26 of the steel and aluminum alloy workpieces 12, 14 at the weld site 16, as shown in FIG. 8 and in FIG. 10. FIG. 8 illustrates the stack-up from the perspective of the narrow side 60' of the weld face 60 of the steel welding electrode 36 and FIG. 10 illustrates the stack-up from the perspective of the long side 60" of the weld face 60 of the steel welding electrode. As illustrated in FIGS. 8 and 10, the contact pressure imparted by the welding electrodes 36, 40 causes the weld face 60 of the steel welding electrode 36 to begin to form a rectangular or elliptical contact patch 66 at the electrode-contacting surface 22 of the steel workpiece 12 and the weld face 44 of the aluminum alloy welding electrode 40 to begin to form a circular contact patch 68 at the electrode-contacting surface 26 of the aluminum alloy workpiece 14.

An electrical current—typically a DC current between about 5 kA and about 50 kA—is then passed between the weld faces 60, 44 of the steel and aluminum alloy welding electrodes 36, 40 and through the stack-up 10 at the weld site 16 in accordance with an appropriate weld schedule. Resistance to the flow of the electrical current through the workpieces 12, 14 initially causes the steel workpiece 12 to heat up more quickly than the aluminum alloy workpiece 14 since it has higher thermal and electrical resistivities. This heat imbalance causes a temperature gradient to form between the steel workpiece 12 and the aluminum alloy workpiece 14. The flow of heat down the temperature gradient toward the water-cooled aluminum alloy welding electrode 40, in conjunction with the generated heat that results from the resistance to the flow of the electrical current across the faying interface 28, eventually melts the aluminum alloy workpiece 14 and forms a molten aluminum alloy weld pool 70, which then wets the faying surface 20 of the steel workpiece 12. The aluminum alloy weld pool 70 is generally non-circular because it is formed by the effect of a circular aluminum alloy weld electrode face 44 and a non-circular (AR >1.5) steel weld electrode face 60.

During the time that electrical current is passed, which can last anywhere from about 40 milliseconds to about 5000 milliseconds, the steel contact patch 66 grows very little, while the aluminum alloy contact patch 68 grows considerably more as the weld face 44 of the aluminum alloy welding electrode 40 indents into the softened aluminum alloy workpiece 14. Because in this embodiment the weld face 44 of the aluminum alloy welding electrode 40 is larger than the weld face 60 of the steel welding electrode 36, the aluminum alloy contact patch 68 is greater in surface area than the steel contact patch 66 at the time passage of the electrical current is ceased. This difference in contact patch sizes results in a greater current density being present within the steel workpiece 12 than in the aluminum alloy workpiece 14 during electrical current flow. Increasing the current density in the steel workpiece 12 during electrical current flow results in a more concentrated heat zone within the steel workpiece 12, especially in the short direction of the steel electrode face, that can improve the integrity and peel strength of the final weld joint, as will be discussed below in more detail. The concentrated heat zone can—but does not necessarily have to—initiate a molten steel weld pool 72 within the steel workpiece 12. The molten steel weld pool 72 is shaped generally like the weld face 60 of the steel welding electrode 36. A molten steel weld pool 72 is narrower in FIG. 6 than it is in its cross section in FIG. 10 because of the non-circular shape of the weld face 60 of the steel welding electrode 36.

Figure 9:
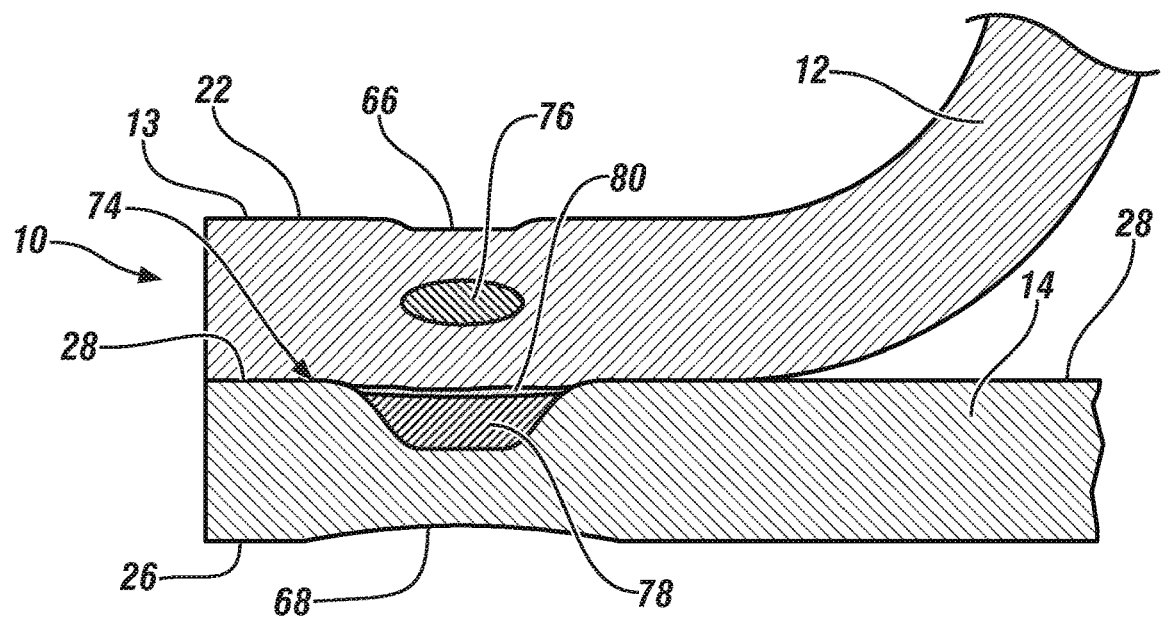
FIG. 9 is an enlarged partial cross-sectional view (stack-up in cross-section) of the stack-up, as presented in FIG. 8, after cessation of the electric current in which a weld joint has been formed at the faying surface and a steel weld nugget has been formed within the steel workpiece.

Upon cessation of the electrical current, the aluminum alloy weld pool 70 solidifies to form a non-circular weld joint 74 at the faying interface 28, as illustrated generally in FIGS. 8-10. The steel weld pool 72, if formed, likewise solidifies at this time into a thin, generally rectangular steel weld nugget 76 within the steel workpiece 12, although it preferably does not extend to either the faying surface 20 or the electrode-contacting surface 22 of the workpiece 12. The weld joint 74 includes a non-circular aluminum alloy weld nugget 78 and, typically, a Fe—Al intermetallic layer 80. The aluminum alloy weld nugget 78 extends into the aluminum alloy workpiece 14 to a distance that often ranges from about 20% to about 80% of the thickness 140 of the aluminum alloy workpiece 14, although on occasion the weld nugget 78 may extend all the way to the electrode-contacting surface 26 (i.e. 100% or full penetration). The Fe—Al intermetallic layer 80 is situated between the aluminum alloy weld nugget 78 and the steel workpiece 12 at the faying interface 28. This layer is generally formed as a result of a reaction between the molten aluminum alloy weld pool 70 and the steel workpiece 12 during current flow and for a short period of time after current flow when the steel workpiece 12 is still hot. It can include $FeAl_3$, $Fe_2Al_5$, and other compounds. When measured in the direction of electrical current flow, the Fe—Al intermetallic layer 80 is typically less than about 10 µm thick and preferably less than about 4 µm thick.

The formation of a concentrated heat zone in the steel workpiece 12—whether by initiation and growth of the molten steel weld pool 72 or not—improves the strength and integrity of the weld joint 74 in at least two ways. First, the concentrated heat changes the temperature distribution through the weld site 16 by altering and creating lateral temperature gradients which, in turn, cause the molten aluminum alloy weld pool 70 to solidify from its outer perimeter towards its center, especially along the short or minor axis direction. This solidification behavior drives weld defects toward the center of the weld joint 74 where they are less prone to weaken its mechanical properties. Second, in those instances in which the steel weld pool 72 is initiated and grown, the faying surface 20 of the steel workpiece 12 tends to distort away from the electrode-contacting surface 22. Such distortion can make the steel workpiece 12 thicker at the weld site 16 by as much as 50%. Increasing the thickness of the steel workpiece 12 in this way helps keep the center of the molten aluminum alloy weld pool 70 hot so that it cools and solidifies last, which can further increase lateral temperature gradients and drive weld defects to conglomerate at or near the center of the weld joint 74. The bulging of the faying surface 20 of the steel workpiece 12 can also locally stiffen the steel substrate reducing stress on the intermetallic layer as well as interfering with crack growth along the faying interface 28 by deflecting cracks along a non-preferred path into the weld joint 74.

Thus, a method has been adapted to utilize the practice of the methods developed for spot welding of a steel alloy workpiece to an aluminum alloy workpiece as disclosed in the above identified co-pending U.S. patent application Ser. No. 14/503,969, filed Oct. 1, 2014, titled "Aluminum Alloy to Steel Welding Process", and assigned to the assignee of this invention. The use of a suitably sized steel welding electrode, with a weld face shaped with an aspect ratio significantly greater than one, allows the weld method disclosed in earlier patent application to be adapted to situations in which the steel workpiece has a narrow area for the placement of a necessary electrical resistance spot weld in a stack-up of the steel workpiece with one or two aluminum alloy workpieces. And the narrow-shaped steel welding electrode, with the suitable aspect ratio greater than 1.5, may be beneficially used in other stack-ups of a combination of up to three steel and aluminum alloy workpieces. The above disclosure comprises illustrative practices of the narrow flange-welding method which are not intended as limitations of the following claims.

What is claimed is:

1. A method of spot welding a steel workpiece to an aluminum alloy workpiece, the method comprising:
   providing a stack-up that includes a steel workpiece with a faying surface overlapping the faying surface of an aluminum alloy workpiece, the thicknesses of each of the steel workpiece and the aluminum alloy workpiece at the location of their faying surfaces not exceeding six millimeters, the steel workpiece and the aluminum alloy workpiece overlapping to provide a faying interface;
   contacting an electrode-contacting surface opposing the faying surface of the steel workpiece with a steel welding electrode, the steel welding electrode having a shaped welding face with an aspect ratio of between greater than 2 and 11;
   simultaneously contacting an electrode-contacting surface opposing the faying surface of the aluminum alloy workpiece with an aluminum alloy welding electrode, the aluminum alloy welding electrode having a circular-shaped welding face with an aspect ratio equal to one;
   passing an electrical current between the steel and aluminum alloy welding electrodes and through the stack-up to initiate a molten aluminum alloy weld pool within the aluminum alloy workpiece and at the faying interface, the electrical current having a greater current density in the steel workpiece than in the aluminum alloy workpiece; and
   ceasing passage of the electrical current at which time a circular contact patch formed by the aluminum alloy welding electrode at the electrode-contacting surface of the aluminum alloy workpiece is greater in surface area than a non-circular contact patch formed by the steel welding electrode at the electrode-contacting surface of the steel workpiece, the contact patch formed by the aluminum alloy welding electrode having a surface area that is greater than the contact patch formed by the steel welding electrode by a ratio of 1.5:1 to 16:1
   wherein the steel workpiece contains a non-circular weld nugget separated in the steel workpiece from the weld nugget in the aluminum alloy workpiece, the weld nugget in the steel workpiece having a higher aspect ratio than the weld nugget in the aluminum alloy workpiece.

2. The method specified in claim 1 in which the stack-up includes the steel workpiece, a first aluminum alloy workpiece and a second aluminum alloy workpiece which lies against the first aluminum alloy workpiece away from the faying interface, the aluminum alloy welding electrode contacting an electrode-contacting surface of the second aluminum alloy workpiece, and the electrical current passed through the stack-up initiates a molten aluminum pool extending through the first aluminum alloy workpiece and into the second aluminum alloy workpiece.

3. The method specified in claim 1 in which the stack-up includes a first steel workpiece, a second steel workpiece which lies against the first steel workpiece away from the faying interface and a single aluminum alloy workpiece, the steel welding electrode contacting an electrode-contacting surface of the second steel workpiece.

4. The method specified in claim 1 in which the welding face of the steel welding electrode is non-round in shape with an aspect ratio greater than 1.5, and the welding face lies on a tapered electrode body which directs contact of the welding face with the steel workpiece, the tapered electrode body being formed with a cut angle, with respect to the welding face, of ten to seventy degrees.

5. The method as specified in claim 1 in which the welding face of the steel welding electrode is non-round in shape with an aspect ratio greater than 1.5 and with a maximum dimension no greater than ten millimeters and a minimum dimension no less than two millimeters.

6. The method specified in claim 1 in which the welding face of the steel welding electrode is elliptical or rectangular in shape and the welding face lies on a tapered electrode body which directs contact of the welding face with the steel workpiece, the tapered electrode body being formed with a cut angle, with respect to the welding face, of ten to seventy degrees.

7. The method specified in claim 1 in which the welding face of the steel welding electrode is elliptical or rectangular in shape with a maximum dimension no greater than ten millimeters and a minimum dimension no less than two millimeters.

8. The method specified in claim 1 in which steel workpiece is a steel sheet having a thickness no greater than one millimeter at the spot weld location and the aluminum alloy workpiece is a sheet having a thickness no greater than 1.2 mm at the spot weld location.

9. The method specified in claim 1 in which the steel workpiece comprises a flange with a weld flat no wider than ten millimeters in which the spot weld is to be formed by contact with the steel welding electrode.

10. The method specified in claim 1 in which the steel workpiece is characterized by a narrow portion which cannot accommodate a round welding face of required diameter of a steel welding electrode to form a spot weld at a spot weld site in the narrow portion, the narrow portion of the steel workpiece and the aluminum alloy workpiece overlapping to provide a faying interface, the electrode-contacting surface at the weld site of steel workpiece being contacted with a steel welding electrode having a non-circular shaped welding face characterized by an aspect ratio greater than 1.5.

11. The method specified in claim 1 in which the stack-up includes a single steel workpiece and two aluminum alloy overlying workpieces joined at the site of the electrical resistance spot weld or two overlying steel workpieces and a single aluminum alloy workpiece joined at the site of the electrical resistance spot weld.

* * * * *